Jan. 28, 1958

N. M. PAYNE 2,821,343

TEMPERATURE AND PRESSURE CONTROL FOR
DUAL DUCT AIR CONDITIONERS

Filed Sept. 14, 1955

INVENTOR.
NELSON M. PAYNE

BY
Lindsey and Prutzman
ATTORNEYS

Jan. 28, 1958 N. M. PAYNE 2,821,343
TEMPERATURE AND PRESSURE CONTROL FOR
DUAL DUCT AIR CONDITIONERS
Filed Sept. 14, 1955 2 Sheets-Sheet 2

INVENTOR.
NELSON M. PAYNE
BY
Lindsey and Prutyman
ATTORNEYS

United States Patent Office 2,821,343
Patented Jan. 28, 1958

2,821,343

TEMPERATURE AND PRESSURE CONTROL FOR DUAL DUCT AIR CONDITIONERS

Nelson M. Payne, Farmington, Conn., assignor, by mesne assignments, to Allied Thermal Corporation, New Britain, Conn., a corporation of Connecticut Application September 14, 1955, Serial No. 534,210

11 Claims. (Cl. 236—13)

This invention relates to temperature and pressure control apparatus for proportioning air or other gases having differential temperatures and varying pressures to provide a mixture of intermediate temperature and constant pressure.

The present invention is particularly suitable for use in air conditioning systems of the type employing separate hot and cold air supply ducts, such as the system described in the copending application of Nelson M. Payne and Richard D. Tutt, Serial No. 380,411, filed September 16, 1953. In such air conditioning systems, air under relatively high pressure and properly conditioned as to humidity and temperature is supplied in both hot and cold condition through separate ducts to individual distribution units spaced throughout a building. In each distribution unit hot and cold primary air is mixed in the proper proportion to produce the temperature desired for the mixture, and then the primary air mixture is combined with room air and released into a room at a comfortable temperature differential and velocity, preferably in sufficient volume to supply all of the heating or cooling desired as well as provide adequate ventilation. In a system of this type, the demands of the individual distribution units upon the hot and cold primary air supplies may vary widely in accordance with different settings or changing external conditions. Particularly in large buildings the demands upon a unit in one part of the building may be entirely different from the demands on a unit in another part of the building. As a consequence, substantial pressure fluctuations may occur in the hot and cold air supplies to any one unit, so that prompt and effective regulation of inlet pressures to each unit is essential to maintain effective temperature control and minimize noise.

Accordingly, one object of the invention is to provide combined proportioning and pressure control apparatus for blending the hot and cold air supplied to such a distribution unit and which is capable of automatically controlling both the temperature and pressure of the air mixture.

Another object is to provide such temperature and pressure control apparatus for proportioning air or other gases having different temperatures and varying pressures which is compact and simplified in construction and capable of efficient trouble-free operation for long periods without attention.

Another object is to provide temperature and pressure control apparatus suitable for blending air or other gases having differential temperatures and varying pressures which responds rapidly to slight variations in both temperature and pressure, and hence is capable of effectively maintaining both temperature and pressure uniformly at the desired levels.

Another object is to provide temperature and pressure control apparatus particularly suitable for use with air conditioning systems which requires no power additional to that normally provided for the air conditioning system itself.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
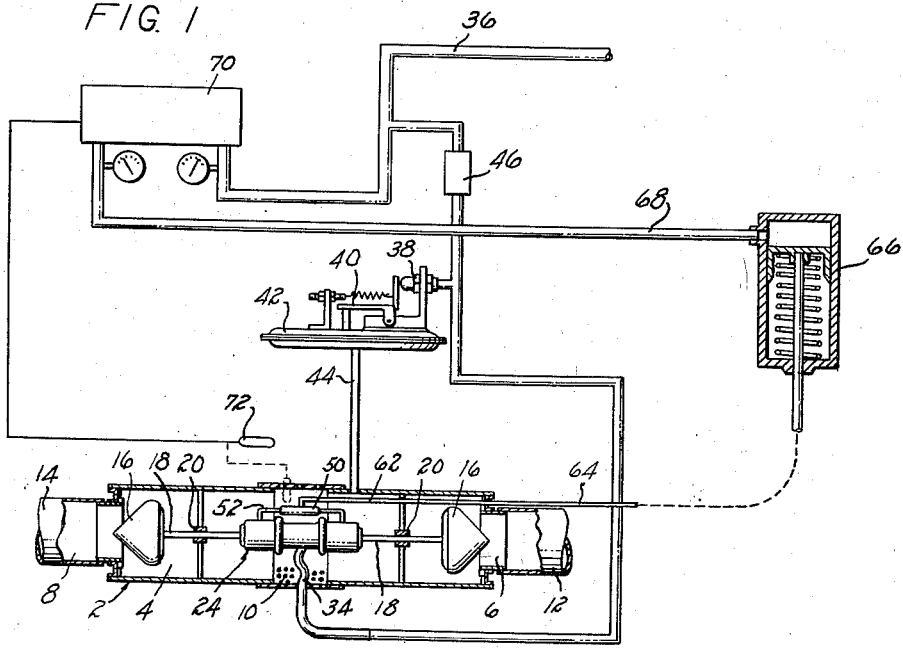
Figure 1 is a fragmentary schematic view partly in section of a temperature and pressure controlled proportioning apparatus constructed in accordance with the present invention.

Referring now to the drawings and particularly to Figure 1, a proportioning apparatus constructed in accordance with the invention includes a casing 2 which may be enclosed within or may be formed by a distribution unit of an air conditioning system. The casing 2 forms a mixing chamber 4 having an inlet 6 for admitting hot air, an axially aligned opposed inlet 8 for admitting cold air, and an outlet illustrated as a perforated screen 10 intermediate the inlets, through which the mixed air may be discharged. Air is supplied to the inlets 6, 8 through the pipes 12 and 14 from the respective main hot and cold air ducts of the air conditioning system (not shown). Opposite each inlet is a conical damper valve 16 carried by a valve stem 18 mounted in a bearing 20 for axial movement toward and away from the inlet, so as to decrease or increase the effective side of the inlet.

Figure 4:
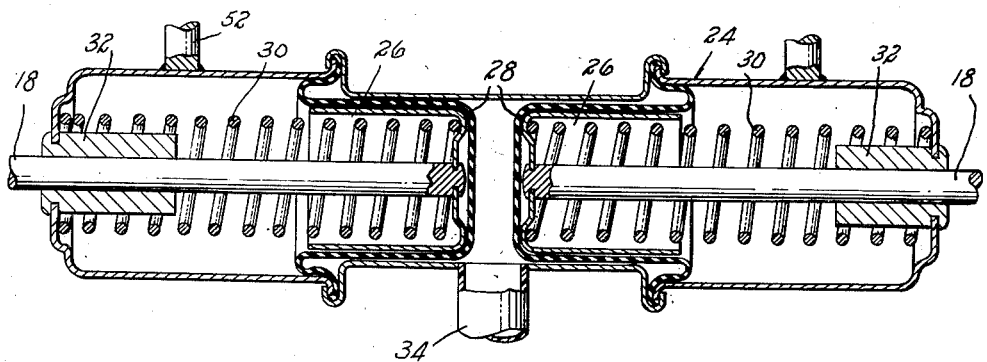
Figure 4 is a further enlarged view partly in section of another portion of the structure shown in Figure 2.

In accordance with the invention, the air proportioning apparatus is arranged to maintain the static pressure in the mixing chamber automatically at a constant preselected level. To this end there is provided in the chamber 4 a pressure control cylinder 24 axially aligned with the damper valve stems 18 and into opposite ends of which the damper valve stems extend, as best shown in Figure 4. On the end of each valve stem 18 is a cup-shaped piston 26 covered by a cup-shaped flexible seal 28 permanently sealed at its periphery to the wall of cylinder 24 so as to prevent air leakage past the piston yet permit limited axial movement of the piston in the cylinder. Each piston is biased toward the center of cylinder 24 by a spring 30 extending between the piston and a bearing sleeve 32 secured to the end of the cylinder. With this arrangement the pressure control cylinder is effectively supported from bearings 20 by the valve stems 18.

Opening into the center of the cylinder 24 is a flexible conduit 34 connected through a pipe 36 to a suitable source of pressurized control fluid which may be pressurized air from one of the main supply ducts. Pressure in the conduit is controlled by a bleed valve 38 therein, as shown in Figure 1. The bleed valve has a bleed orifice which is opened and closed by a linkage 40 operated by a diaphragm 42 exposed to the static pressure in the mixing chamber 4 through a pressure-sensing tube 44 extending into the chamber. A restrictor 46 at the supply end of conduit 34 limits the flow of fluid into the conduit sufficiently to make the operation of bleed valve 38 effective in varying the pressure in the conduit.

With this arrangement, if the pressure in chamber 4 rises above the selected value, bleed valve 38 immediately closes and boosts the pressure in conduit 34, thereby moving the pistons 26 and damper valves 16 further apart and throttling air flow into the mixing chamber through both inlets simultaneously, so as to reduce the pressure promptly to the selected level. Conversely, a pressure fall in the mixing chamber promptly opens the bleed valve and lowers the pressure behind pistons 26, thereby permitting springs 30 to retract both damper valves 16 and increase the air flow into the mixing chamber through both inlets so as to increase the pressure. Positioning of the damper valves 16 in this manner thus has an immediate effect on the pressure in chamber 4 while having a negligible effect on the ratio of the air flow through the two inlets. The bleed valve control linkage may be conveniently adjusted to provide for maintenance of the pressure in chamber 4 at any desired level.

Figure 3:
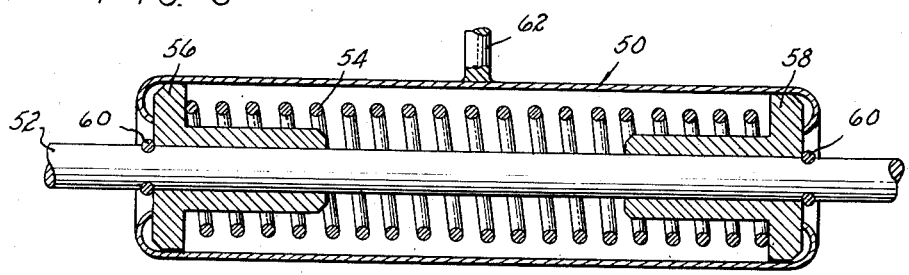
Figure 3 is a further enlarged view partly in section of a portion of the structure shown in Figure 2.

Further in accordance with the invention the temperature of the mixture in chamber 4 is automatically controlled by operation of the same damper valves 16 which control the pressure. To this end there is provided in chamber 4 a cylindrical connector 50 through which extends axially a rod 52 having downturned ends connected to the pressure control cylinder 24. The connector 50 is disposed parallel to the pressure control cylinder and is connected to rod 52 for limited axial lost motion in both directions by an overtravel spring 54 acting between a pair of collars 56, 58 slidably mounted on the rod and each restrained from outward movement by a locking ring 60, as best shown in Figure 3. Connector 50 is arranged to be moved axially by a push rod 62 having a flexible extension supported in a tube 64 and connected to the reciprocable spring-backed piston of a fluid motor 66, as shown in Figure 1. Connected to the fluid motor is a conduit 68 through which the motor may be supplied with pressurized fluid from any suitable source such as pipe 36. Fluid flow to the motor is regulated by a thermostatic valve 70 having a temperature-sensing bulb 72. The bulb 72 may be either inside or outside chamber 4, as shown in Figure 1, but is preferably so located as to be exposed to the temperature of the room supplied by the distribution unit.

Figure 2:
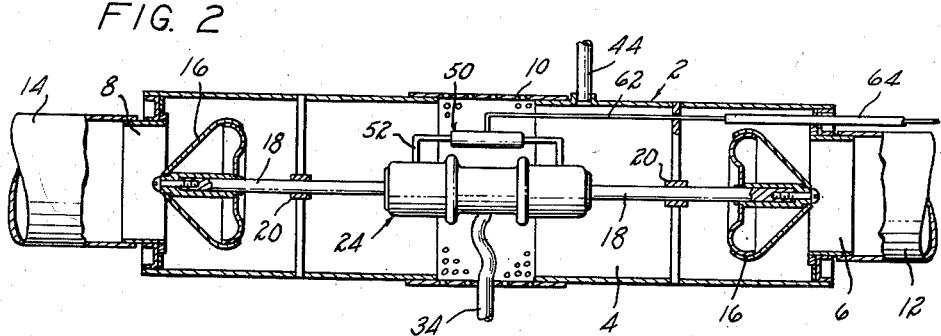
Figure 2 is an enlarged view partly in section of a portion of the structure shown in Figure 1.

With this arrangement when room temperature falls below that desired, the valve 70 is opened and the fluid motor 66 drives the connector 50 to the left, as shown in Figures 1 and 2, thereby moving the pressure control cylinder 24 bodily to the left, and moving both damper valves 16 in tandem in a left-hand direction. This throttles air flow through the cold air inlet 8 while at the same time increasing flow through the hot air inlet 6, and thus promptly increases the temperature of the mixture to a level sufficient to return room temperature to the desired level. Conversely, when room temperature rises above the desired level, the thermostat valve 70 is closed and the temperature control motor 66 moves the connector 50 in the right-hand direction, reducing the supply of hot air to the mixing chamber and simultaneously increasing the supply of cold air. Since flow through one inlet is decreased during temperature regulation while flow through the other inlet is simultaneously increased, variation in pressure resulting from movement of the damper valves is minimized, and thus the apparatus provides effective temperature control with minimum disturbance of pressure regulation.

It is a particular advantage of the apparatus above described that if the movement of either damper valve in response to the combined pressure and temperature signals is sufficient to completely close off the air inlet which it throttles, thereby seating the valve and positively preventing further valve movement in the closing direction, a further outward displacement of the pistons 26 in the pressure control cylinder 24 will result in the movement of the pressure control cylinder as a whole relative to the mixing chamber 4 until the other damper valve throttles air flow into the chamber sufficiently to lower the pressure to the desired value. Thus injury or jamming of the parts is avoided. Likewise when one of the damper valves is completely closed and further movement of the connector 50 is such as to tend to move the closed damper valve further in a closing direction, such movement of connector 50 is taken up by compression of the overtravel spring 54, the limited lost motion thus afforded allowing the system to continue to respond effectively without injury to any of the parts.

Thus it may be seen that the invention provides apparatus for proportioning air or other gases of different temperature and varying pressure which effectively and continuously controls both the pressure and temperature of the mixture completely automatically. The apparatus is sensitive and responds rapidly to variations in both temperature and pressure, yet is compact and simplified in construction requiring little or no attention or adjustment for long periods. Though particularly suitable for use in air conditioning systems, it will be appreciated that the apparatus also has general utility in the proportioning of any gases having differential temperatures and varying pressures where a mixture having an intermediate temperature and regulated pressure is required.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. Temperature and pressure control apparatus comprising a chamber having a pair of inlets for receiving gases at differential temperatures and varying pressures, support means mounted for movement relative to said inlets, a valve for each inlet mounted on said support means, pressure and temperature responsive means for automatically moving the valves simultaneously in a closing direction or simultaneously in an opening direction to vary the pressure in the chamber and automatically and simultaneously moving one of the valves in a closing direction and the other valve in an opening direction to vary the temperature in the chamber including means to move said support means.

2. Temperature and pressure control apparatus for use in an air conditioning system comprising a chamber having a pair of inlets for receiving air at differential temperatures and varying pressures, a support mounted for movement relative to said inlets, a valve for each inlet mounted on said support for movement relative to each other and to the support, temperature responsive means for moving the support relative to said inlets, and pressure responsive means for simultaneously moving the valves relative to each other and to the support.

3. Temperature and pressure control gas proportioning apparatus comprising a chamber having a pair of opposed inlets for receiving respective gases at differential temperatures and varying pressures, a support in said chamber mounted for movement relative to said inlets, a pair of oppositely facing valves respectively associated with said inlets carried by said support for simultaneous movement therewith in a closing and in an opening direction relative to said inlets and mounted for movement relative to each other and to the support, means controlled by the pressure in the chamber for moving both valves simultaneously relative to said support, and temperature sensitive means for moving the support relative to the inlets to simultaneously move one of the valves in a closing direction and the other valve in an opening direction to control the temperature in the chamber.

4. Temperature and pressure control gas proportioning apparatus comprising a chamber having a pair of inlets for receiving respective gases at differential temperatures and varying pressures, a valve assembly comprising a closure member for cooperation with each of the inlets and a support of variable length for the closure members for controlling the pressure within the chamber, means to automatically vary the length of said support in response to changes in pressure within the chamber and means for moving the valve assembly as a unit relative to the inlets to change the proportion of the gases admitted through the inlets and thus control the temperature within the chamber.

5. Temperature and pressure control apparatus for use in an air conditioning system comprising a chamber having a pair of inlets for admitting air at differential temperatures and varying pressures, a pair of valves in the chamber each movable in a closing and opening direction relative to a respective inlet, a pressure control cylinder having a pair of opposed pistons each connected to one of said valves, means controlled by the pressure in the chamber for moving said pistons simultaneously in opposite directions to move said valves simultaneously in a closing direction or simultaneously in an opening direction, and means responsive to temperature for moving said pressure control cylinder bodily to simultaneously move one of the valves in a closing direction and the other valve in an opening direction.

6. Temperature and pressure control apparatus for use in an air conditioning system comprising a chamber having a pair of axially aligned opposed inlets for receiving air at differential temperatures and varying pressures, a pair of axially aligned oppositely facing valves in the chamber each movable in a closing and opening direction relative to a respective inlet, an axially movable pressure control cylinder disposed between the valves having a pair of opposed pistons each connected to one of the valves, means controlled by the pressure in the chamber for varying the spacing of said pistons to move the valves simultaneously in a closing direction or simultaneously in an opening direction, and means for axially moving said pressure control cylinder bodily to simultaneously move one of the valves in a closing direction and the other valve in an opening direction and thus control the temperature in the chamber.

7. Temperature and pressure control apparatus for use in an air conditioning system comprising a chamber having a pair of axially aligned opposed inlets for receiving air at differential temperatures and varying pressures, a pair of axially aligned oppositely facing valves in the chamber each movable in a closing and opening direction relative to a respective inlet, an axially movable pressure control cylinder disposed between the valves having a pair of opposed pistons each connected to one of the valves, means controlled by the pressure in the chamber for varying the spacing of said pistons to move the valves simultaneously in a closing direction or simultaneously in an opening direction, a connector reciprocable parallel to the path of said valves and positioned according to temperature, and means forming a resilient driving connection between said connector and said pressure control cylinder.

8. Temperature and pressure control apparatus for use in an air conditioning system comprising a mixing chamber having a pair of opposed inlets for admitting air at different temperatures and varying pressures, a pair of oppositely facing valves in the mixing chamber each movable in a closing and opening direction relative to a respective inlet, a pressure control cylinder movable axially parallel to the path of said valves and having opposed pistons each connected to one of said valves, means for introducing pressurized fluid between said opposed pistons to vary the spacing of said pistons, means controlled by the pressure in the mixing chamber for varying the pressure of said pressurized fluid, and means for axially moving said pressure control cylinder bodily relative to the inlets to simultaneously move one of the valves in a closing direction and the other valve in an opening direction and thus control the temperature within the chamber.

9. Temperature and pressure control apparatus for use in an air conditioning system comprising a mixing chamber having a pair of axially aligned opposed inlets for admitting air at different temperatures and varying pressures, a pair of axially aligned oppositely facing valves in the mixing chamber each movable in a closing and opening direction relative to a respective inlet, an axially movable pressure control cylinder disposed between the valves and having opposed pistons each connected to one of said valves, springs in said pressure control cylinder urging said pistons together, means for introducing pressurized fluid between said opposed pistons to vary the spacing of said pistons, means controlled by the pressure in the mixing chamber for varying the pressure of said pressurized fluid, and temperature control means for moving said pressure control cylinder bodily relative to said inlets in an axial direction to simultaneously move one of the valves in a closing direction and the other valve in an opening direction.

10. Temperature and pressure control apparatus for use in an air conditioning system comprising a mixing chamber having a pair of axially aligned opposed inlets for admitting air at different temperatures and varying pressures, a pair of axially aligned oppositely facing valves in the mixing chamber each movable in a closing and opening direction relative to a respective inlet, an axially movable pressure control cylinder disposed between the valves and having opposed pistons each connected to one of said valves, springs in said pressure control cylinder urging said pistons together, means for introducing pressurized fluid between said opposed pistons to vary the spacing of said pistons, means controlled by the pressure in the mixing chamber for varying the pressure of said pressurized fluid, a connector reciprocable parallel to the path of said valves and positioned according to temperature, and means forming a resilient driving connection between said connector and said pressure control cylinder.

11. In an air conditioning system including individual room distribution units each having a pair of supply pipes adapted to be connected to separate sources of warm and cool air, an air proportioning chamber in each unit having a pair of inlets fed by said supply pipes, a valve assembly comprising a valve for each inlet and means for closing the valves in unison or opening the valves in unison to control the pressure in the chamber, and means sensitive to room temperature for moving the valve assembly as a unit to change the proportion of air admitted through the inlets and thus control the temperature within the chamber.

References Cited in the file of this patent
UNITED STATES PATENTS

| | | |
|---|---|---|
| 2,705,595 | Carlson et al. | Apr. 5, 1955 |
| 2,710,724 | McMahon | June 14, 1955 |
| 2,720,151 | Kreuttner | Oct. 11, 1955 |
| 2,727,454 | Jones | Dec. 20, 1955 |